Feb. 2, 1926.

I. N. TUSING

TRACTION LUG

Filed May 19, 1925

1,571,821

Inventor

I. N. Tusing

By Lacy & Lacy, Attorneys

Patented Feb. 2, 1926.

1,571,821

UNITED STATES PATENT OFFICE.

ISAAC N. TUSING, OF RYE, COLORADO.

TRACTION LUG.

Application filed May 19, 1925. Serial No. 31,428.

*To all whom it may concern:*

Be it known that I, ISAAC N. TUSING, a citizen of the United States, residing at Rye, in the county of Pueblo and State of Colorado, have invented certain new and useful Improvements in Traction Lugs, of which the following is a specification.

This invention relates to an improved traction lug for use upon automobile tires and one object of the invention is to provide a traction lug so constructed that it may be firmly held in place upon the tread portion of a tire in snug engagement therewith and at the same time be permitted to have movement with the tire as the automobile wheel rotates and the lug is brought into engagement with the ground and the ground-engaging portion of the tire compressed.

Another object of the invention is to so construct the traction lug that it may serve to prevent spinning of a wheel while moving across a soft or slippery place in a road and also serve to prevent side skidding.

This invention is illustrated in the accompanying drawing, wherein

Figure 1:
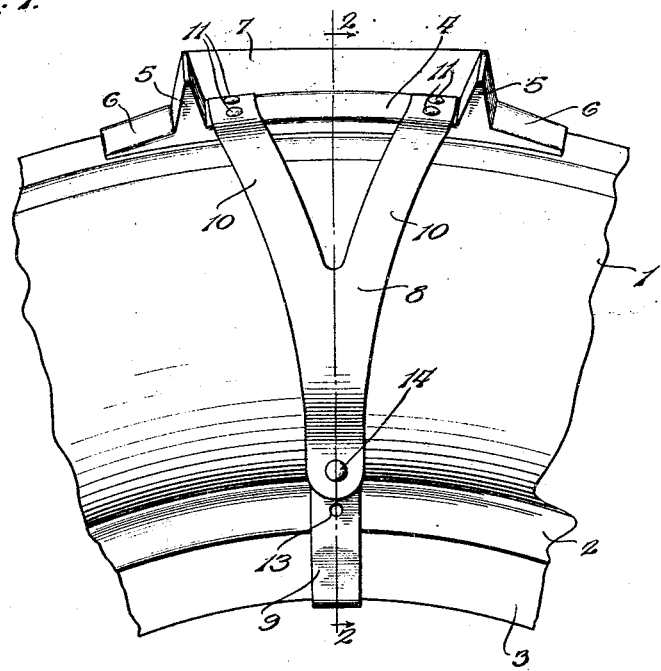
Figure 2:
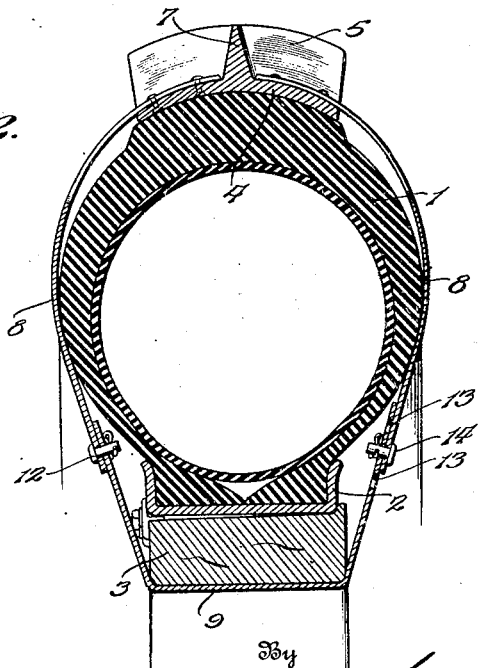

Figure 1 is a view in side elevation showing a fragment of a tire and wheel with the improved traction lug in place, and Fig. 2 is a sectional view taken on the line 2—2 of Fig. 1.

The improved traction lug is for use in connection with the tire 1 of an automobile wheel. The tire 1 is a conventional pneumatic tire and is carried by a rim 2 which fits upon the felly 3 of the automobile wheel. The traction lug will be preferably formed of cast metal and has a body portion 4 formed as a plate curved longitudinally and transversely so that it will have close fitting engagement with the tread portion of the tire when in place. The ribs 5 which serve to prevent spinning of the automobile wheel when traveling over a soft or slippery place in the road are disposed transversely of the body 4 in spaced relation to each other longitudinally of the body and in spaced relation to the ends of the body. These ribs or cleats 5 have their outer or road-engaging edges curved, as shown in Fig. 2, so that they may have good engagement with the ground and their intermediate portions readily dig into the roadbed. It should also be noted that the end portions 6 of the body taper towards its ends and thereby provide feathered end portions. The end portions of the body may, therefore, move into and out of engagement with the ground without the end portions being liable to strike against stones or other obstructions. This prevents the body of the lug from being broken when the lug is in use. A rib 7 extends longitudinally of the body intermediate its width and between the cleats 5. This rib 7 serves to dig into the roadbed and prevent side skidding. Its outer ground-engaging edge is straight throughout its length so that, when this strip 7 is embedded in the ground, it may have firm engagement with the roadbed.

The lug is to be secured upon the tread portion of the tire and in order to do so there has been provided side arms 8 and a fellyengaging strip or yoke 9. The side arms are formed of sheet metal and each is provided with diverging fingers 10 which overlap the side portions of the body 4 of the lug and are secured to the outer face thereof between the cleats 5 by means of rivets or other suitable fasteners 11. The strip 9 extends transversely across the felly 3 and has its end portions bent to extend towards the free ends of the arms 8. One end portion of the strip 9 is provided with a single opening to register with an opening formed in one of the arms 8 and receive a connecting pin 12 and the other end portion of the strip 9 is provided with a plurality of openings 13 spaced longitudinally of the strip and any one of which is intended to be brought into registry with an opening in the second arm 8 and receive a connecting pin 14. By providing a plurality of openings 13, the strip 9 may be drawn tightly across the felly and the pin 14 then passed through the arm 8 and proper opening 13. The lug will, therefore, be firmly held upon the tire. It should be noted that the pins 12 and 14 are circular in cross section and when in place will constitute pivot pins. The arms 8 are, therefore, permitted to have rocking movement at their connections with the ends of the strip 9 and as the wheel rotates the lug will be permitted to have tilting movement as it engages and leaves the ground. This prevents excessive strain upon the side arms 8 and strip 9 and reduces the danger of these arms being torn loose from the sides of the lug or torn loose from the strip 9.

When this device is in use, the lug is placed against the tread of the tire with its arms extending along the side portions of the tire. The strip 9 is then passed across the felly of the wheel. The pins 12 and 14 can now be put in place and the device will be securely held upon the tire. As many of these devices as desired may be put in place and spaced from each other the proper distance about the circumference of the tire. When no longer needed, it is simply necessary to remove the pin 14 and the device can be easily and quickly taken from the tire and put away until again needed.

Having thus described the invention, I claim:

1. A traction lug comprising a body curved longitudinally and transversely for conforming to the transverse and circumferential contour of a tire tread, cleats extending transversely across the outer face of said body adjacent the ends thereof and tapered outwardly and having their ground-engaging edges conforming to the transverse curvature of said body, the portions of the body from said cleats to the ends of the body being reduced in thickness to provide feathered end portions, a cleat extending longitudinally of the body intermediate the width thereof from one transverse cleat to the other and tapered outwardly, arms for extending transversely along the side portions of a tire and each having one end portion provided with diverging fingers secured to the outer face of said body between said transverse cleats, and means for extending transversely across the felly of a wheel and connecting said arms.

2. A traction lug comprising a body adapted for close fitting engagement with the tread face of a tire, cleats extending transversely across the outer face of said body in spaced relation to the ends thereof, a cleat extending longitudinally of the body intermediate the width thereof from one transverse cleat to the other, arms adapted to extend transversely along the sides of a tire and each having its outer end portion provided with diverging fingers secured upon the outer face of said body between the transverse cleats in close proximity to the transverse cleats and longitudinally extending cleat, and means for extending transversely across a wheel felly and connecting said arms.

In testimony whereof I affix my signature.

ISAAC N. TUSING. [L. S.]